(12) United States Patent
Beigang et al.

(10) Patent No.: US 11,187,283 B2
(45) Date of Patent: Nov. 30, 2021

(54) OVERRUNNING CLUTCH

(71) Applicant: GKN Automotive Ltd., Birmingham (GB)

(72) Inventors: Wolfgang Beigang, Neunkirchen-Seelscheid (DE); Thomas Weckerling, Sankt Augustin (DE)

(73) Assignee: GKN Automotive Ltd., Birmingham (GB)

( * ) Notice: Subject to any disclaimer, the term of this patent is extended or adjusted under 35 U.S.C. 154(b) by 0 days.

(21) Appl. No.: 16/645,645

(22) PCT Filed: Sep. 12, 2017

(86) PCT No.: PCT/EP2017/072876
§ 371 (c)(1),
(2) Date: Mar. 9, 2020

(87) PCT Pub. No.: WO2019/052635
PCT Pub. Date: Mar. 21, 2019

(65) Prior Publication Data
US 2020/0277998 A1    Sep. 3, 2020

(51) Int. Cl.
*F16D 41/12*    (2006.01)
*F16D 41/14*    (2006.01)
(Continued)

(52) U.S. Cl.
CPC ........... *F16D 41/125* (2013.01); *F16D 41/14* (2013.01); *F16D 41/16* (2013.01); *F16D 2125/50* (2013.01); *F16D 2500/10406* (2013.01)

(58) Field of Classification Search
CPC ........ F16D 41/125; F16D 41/14; F16D 41/16; F16D 2125/50; F16D 2500/10403
See application file for complete search history.

(56) References Cited

U.S. PATENT DOCUMENTS

| 1,396,343 A | 11/1921 | Richardson |
| 1,883,966 A | 10/1932 | Krause |
| (Continued) | | |

FOREIGN PATENT DOCUMENTS

| CN | 1320774 A | 11/2001 |
| CN | 2602214 Y | 2/2004 |
| (Continued) | | |

OTHER PUBLICATIONS

Chinese Office Action for Application No. CN201780094828.X dated Jan. 12, 2021 (14 pages; with English machine translation).
(Continued)

*Primary Examiner* — David J Hlavka
(74) *Attorney, Agent, or Firm* — Bejin Bieneman PLC

(57) ABSTRACT

In an overrunning clutch, a clutch link axially overlaps another clutch link and a control element of a control mechanism, via which the axial displacement of a connecting link acting between the clutch links is initiated, is arranged on the radial inside of the overlap on the connecting link. The overrunning clutch is particularly suitable for use in a drive train of a motor vehicle and which can transmit high torque despite compactness in structure, operates extensively without noise in the overrunning direction, and has only low mass to be moved during a shifting process.

20 Claims, 4 Drawing Sheets

(51) Int. Cl.
*F16D 41/16* (2006.01)
*F16D 125/50* (2012.01)

(56) References Cited

U.S. PATENT DOCUMENTS

| | | | |
|---|---|---|---|
| 2,323,353 A | 7/1943 | Plog | |
| 2,574,004 A | 11/1951 | Zingsheim | |
| 4,126,214 A | 11/1978 | Kiss | |
| 4,771,872 A | 9/1988 | Kampf | |
| 5,692,590 A | 12/1997 | Iihara | |
| 6,155,394 A | 12/2000 | Shook | |
| 6,193,038 B1 * | 2/2001 | Scott | B23P 15/00 192/46 |
| 7,980,372 B2 | 7/2011 | Wiesneth | |
| 8,056,690 B2 * | 11/2011 | Samie | F16D 41/084 192/43.1 |
| 8,210,331 B2 | 7/2012 | Keshtkar | |
| 8,286,772 B2 * | 10/2012 | Eisengruber | F16D 41/125 192/43.1 |
| 9,109,636 B2 * | 8/2015 | Kimes | F16D 27/09 |
| 2006/0260896 A1 | 11/2006 | Jung | |
| 2008/0185253 A1 * | 8/2008 | Kimes | F16H 57/08 192/46 |
| 2012/0228076 A1 * | 9/2012 | Tate, Jr. | F16D 48/064 192/66.1 |
| 2014/0374212 A1 | 12/2014 | Tamura | |
| 2017/0023073 A1 | 1/2017 | Rivera | |

FOREIGN PATENT DOCUMENTS

| | | |
|---|---|---|
| CN | 1604997 A | 4/2005 |
| CN | 101990608 A | 3/2011 |
| CN | 103299098 A | 9/2013 |
| CN | 104019154 A | 9/2014 |
| CN | 105473885 A | 4/2016 |
| CN | 106641011 A | 5/2017 |
| CN | 107923447 A | 4/2018 |
| DE | 632395 C | 7/1936 |
| DE | 763479 C | 1/1952 |
| DE | 2354332 A1 | 5/1974 |
| DE | 11 2015 001203 T5 | 12/2016 |
| DE | 10 2017 104 053 A1 | 9/2017 |
| EP | 1148264 A1 | 10/2001 |
| GB | 2034420 B | 10/1982 |
| JP | H08326784 A | 12/1996 |
| JP | 2014173633 A | 9/2014 |
| KR | 20020015507 A | 2/2002 |
| WO | 2012078202 A1 | 6/2012 |
| WO | 2018099542 A1 | 6/2018 |

OTHER PUBLICATIONS

International Search Report and Written Opinion for PCT/EP2017/072876 dated Jun. 13, 2018 (10 pages; with English translation).
International Search Report and Written Opinion for PCT/EP2017/072882 dated Jun. 13, 2018 (10 pages; with English translation).
Chinese Office Action for application No. CN201780094832.6 dated Jan. 4, 2021 (10 pages; with English machine translation).
Chinese Office Action for Application No. CN201780094832.6 dated Aug. 6, 2021 (10 pages; with English machine translations).
Feng, Ding et al; Study on Shock of Tootled Electromagnetic Clutch Based on ANSYS/LS-DYNA Software; Journal of Machine Design, Feb. 2012; vol. 29 No. 2.
Feng Ding; "Mechanical Design", Feb. 20, 2012.

* cited by examiner

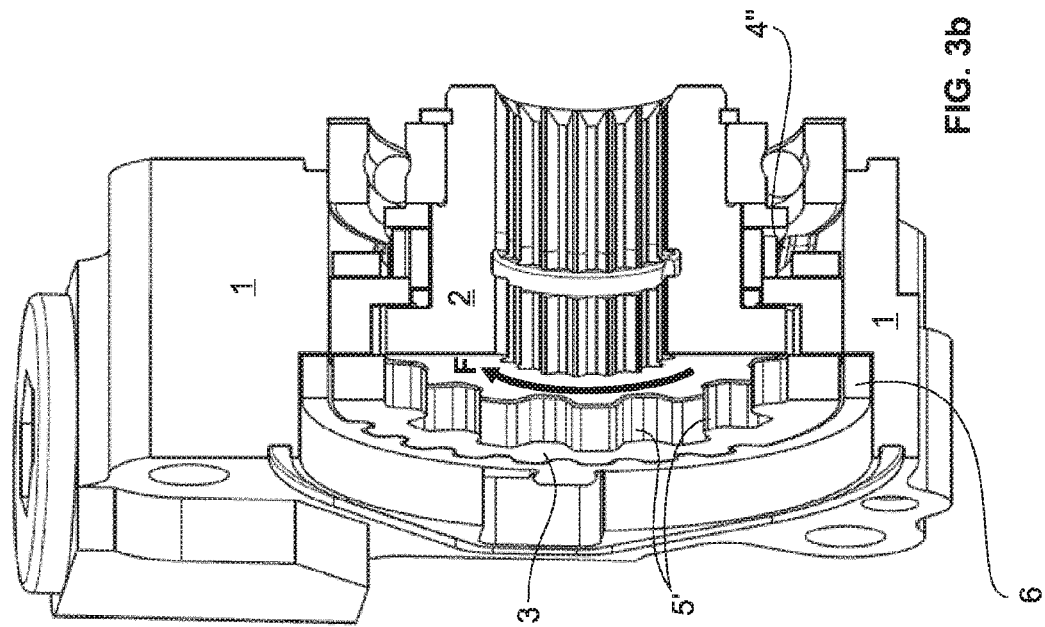
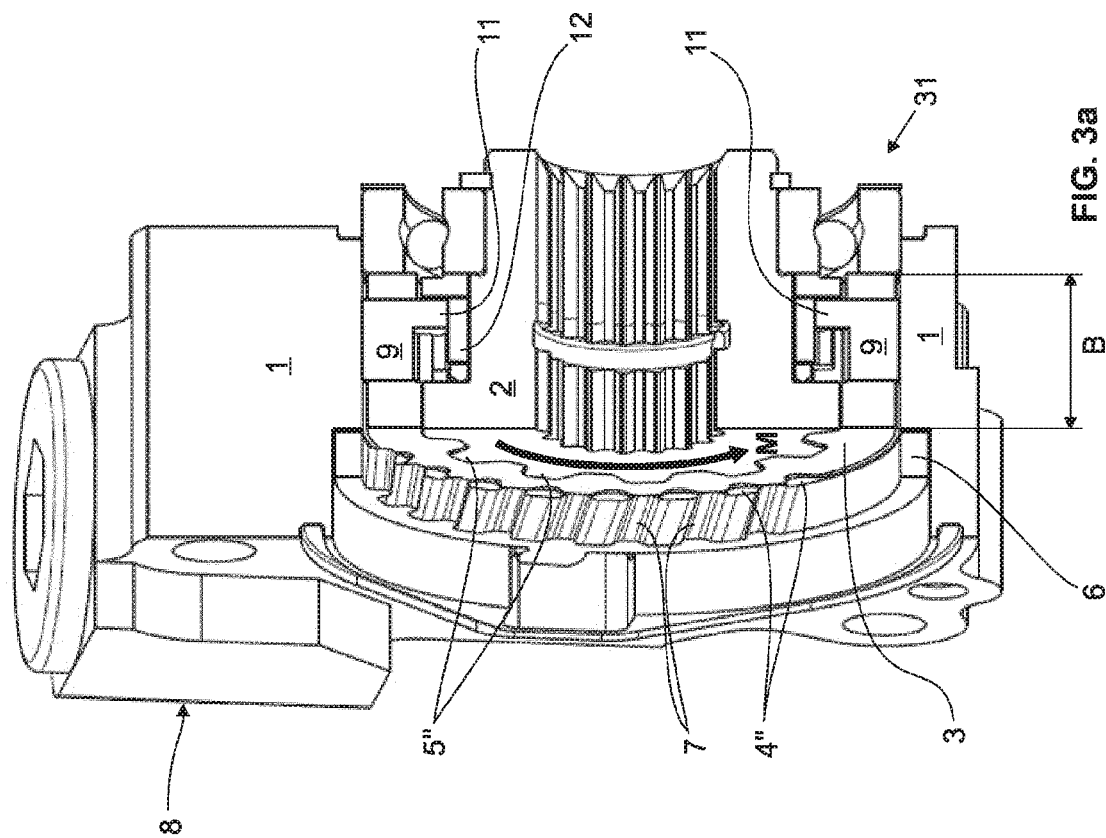

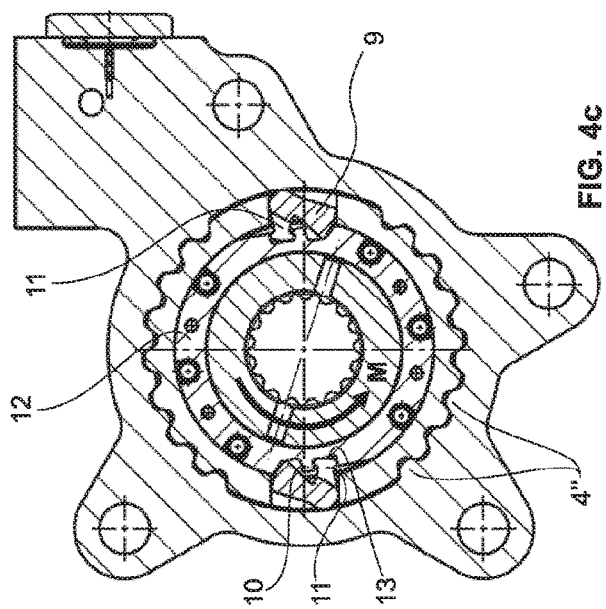
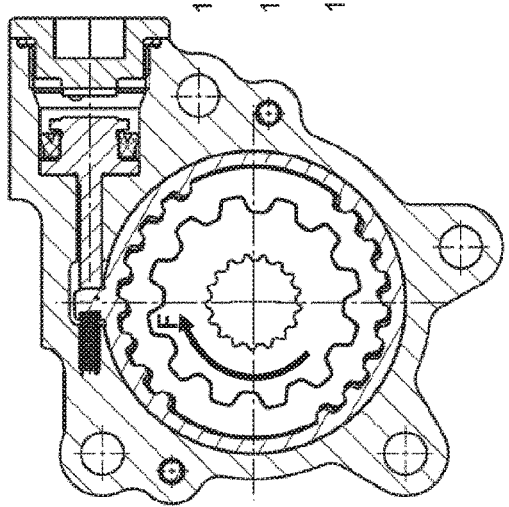
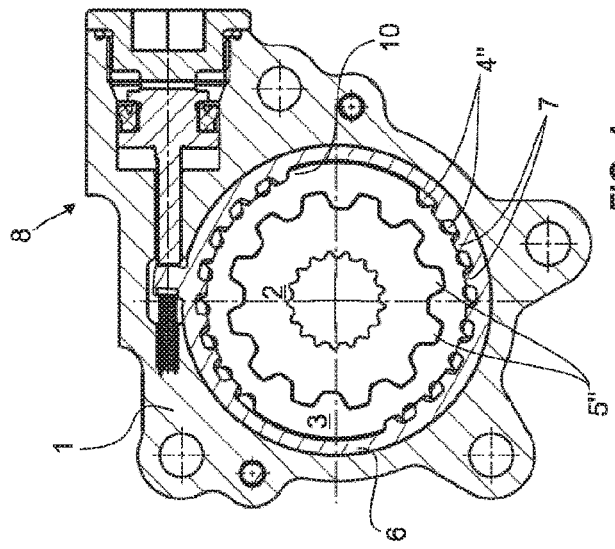
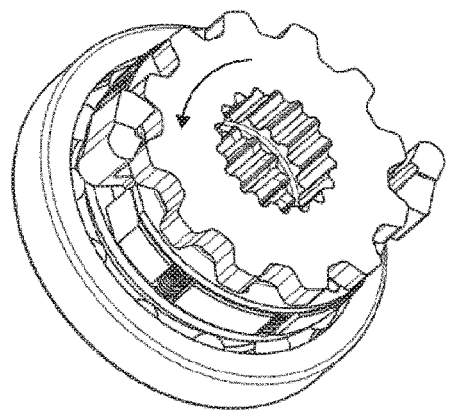
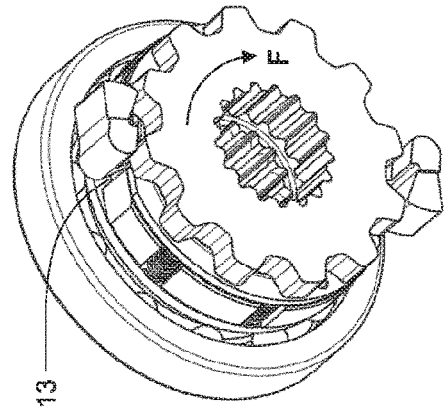
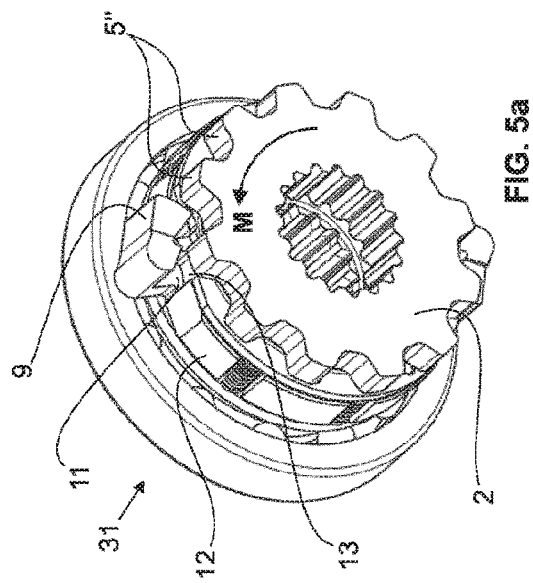
FIG. 4a  FIG. 4b  FIG. 4c
FIG. 5a  FIG. 5b  FIG. 5c

OVERRUNNING CLUTCH

CROSS-REFERENCE TO RELATED APPLICATIONS

This application is a national stage of, and claims priority to, Patent Cooperation Treaty Application No. PCT/EP2017/072876, filed on Sep. 12, 2017, which application is hereby incorporated herein by reference in its entirety.

BACKGROUND

A person skilled in the art is familiar with overrunning clutches, which allow free rotation of two clutch members relative to one another in an overrunning rotation direction and which, under rotational loading opposite to the overrunning rotation direction (load rotation direction), produce a rotationally fixed connection between the two clutch members. Overrunning clutches can be used as override clutches or as backstops.

Customary overrunning clutches are those with spring-loaded pawls which are arranged pivotably on one of the two clutch members or on an intermediate member arranged between the two clutch members and, depending on the direction of a relative rotation of the clutch members with respect to one another, ensure free rotation or a rotationally fixed connection between the clutch members. The typically permanently spring-loaded pawls come into positive contact with driving stops to produce a rotationally fixed connection under rotational loading, or in the load rotation direction, opposite to the overrunning direction. By contrast, when the overrunning clutch is loaded in the overrunning rotation direction, the pawls sweep over the driving stops without blocking a rotation of the clutch members relative to one another.

A disadvantage with such overrunning clutches is that the torque to be transmitted via the clutch in the load rotation direction has to be transmitted via the pawls and the driving stops. The pawls, as components which have to be configured in a relatively delicate manner and which have to be mounted pivotably and with spring loading within the clutch via even more delicate components, have only a small torque transmission potential. This applies all the more when the effective diameters on which the pawl acts on the clutch members are small and a torque to be transmitted has to be supported via a small lever arm and, on account of the small diameter, fewer or only relatively small pawls can be distributed over the circumference. In addition, the sweeping-over of the driving stops by the pawls positioned permanently against them causes a noise which is typical for many overrunning clutches and which, with clutches which are increasingly designed to be larger and more stable, becomes increasingly louder and can be unacceptably disturbing.

Against this background, overrunning clutches have been developed in which use is made of an intermediate member which acts between the two clutch members of the overrunning clutch and which is displaceable in the axial direction between an overrunning position and an engagement position in which the intermediate member is in engagement with the two clutch members via a highly loadable load toothing.

Document DE 763 479 discloses an overrunning clutch in which a clutch claw member arranged between a first clutch member and a second clutch member is displaced axially from an overrunning position into an engagement position in order to positively couple together the two clutch members in at least one rotational loading direction via a toothing pointing in the axial direction. Also provided is a locking mechanism in which the overrunning clutch can be blocked overall via the axial displacement of a sliding ring, with the result that it can transmit torque in both directions. An overrunning clutch having similar functionality is disclosed in document DE 2 354 332, with radially inwardly or outwardly pointing toothings being provided here.

Such overrunning clutches are complex in design and complicated to manufacture. They have a particularly large bulk in the axial direction and provide control pawls which, with the clutch situated in the overrunning position, are permanently positioned with spring loading against control stops or sweep over them with a striking action, with the result that highly perceptible noise generation is to be expected when using such an overrunning clutch. The complex design of the intermediate member results in the masses to be moved being large and the switching pulses occurring during a switching operation being high.

For applications in motor vehicle construction, in particular for applications in a part of a drive train which, by virtue of the provision of step-down stages, require a high torque transmission potential and in which moreover a particularly compact, easy-to-manufacture overrunning clutch which can be integrated into the surrounding drive train architecture in a space-saving manner and has little fault susceptibility is desirable and which switches quickly and with low masses to be moved and with small mechanical switching pulses and is intended to provide noiseless freewheeling, such overrunning clutches are therefore not suitable and do not constitute an expedient application to a person skilled in the art of automotive drive technology.

SUMMARY

A self-switching overrunning clutch is disclosed for use in a drive train of a motor vehicle, in particular in a passenger car. Such an overrunning clutch can be used in an electromotively driven axle drive unit for driving the wheels of an axle of a motor vehicle, in particular of a car, and to an axle drive unit equipped with such an overrunning clutch.

The overrunning clutch can be particularly suitable for use in a drive train of a motor vehicle, in particular in an electromotively driven axle drive unit, is easy to integrate, has low fault susceptibility, can transmit a high torque, is of compact design, can be manufactured easily, and also operates substantially noiselessly in the overrunning rotation direction. The masses to be moved for a switching operation are intended to be kept low such that only small switching pulses occur during a switching operation and the latter can be performed quickly. Such an overrunning clutch can be included in an axle drive unit.

The overrunning clutch according to the disclosure is formed by an overrunning clutch having a first clutch member, a second clutch member and an intermediate member which interacts with the first clutch member and second clutch member and which, depending on the direction of the rotational loading of the overrunning clutch, assumes an overrunning position, in which a free rotation of one clutch member with respect to the other is allowed in an overrunning rotation direction, or an engagement position, in which a rotationally fixed connection between the two clutch members is produced via the intermediate member with rotational loading, or in a load rotation direction, opposite to the overrunning rotation direction, wherein the intermediate member is arranged in an axially displaceable manner and a change between the overrunning position and the engagement position occurs by an axial displacement of the intermediate member, and wherein at least one control mechanism is provided which initiates the axial displacement of the intermediate member from the overrunning position into the engagement position via a control element, in particular by means of a control pawl.

In an embodiment, there is provision that the first clutch member axially overlaps the second clutch member in the engagement position with the formation of an effective toothing width, and the control element, in particular the control pawl, is arranged on the intermediate member at least partially, but in particular completely within the toothing width.

Additionally or alternatively to the aforementioned embodiment, there can be provision that the control element is arranged on the intermediate member and comes into contact, in the overrunning position, with a load toothing provided on the first clutch member or on the second clutch member in order to initiate the axial displacement of the intermediate member into the engagement position when the rotational loading changes from the overrunning rotation direction into the load rotation direction.

The two embodiments described above can contribute either jointly or as alternatives to realizing an overrunning clutch in an advantageous manner. However, it is particularly preferred if both embodiments are used jointly.

The toothing width B is the width of the toothing overlap which is effective overall for the torque transmission in the engagement position and is defined by the axial distance which is bridged overall by the load toothing pairings, which are effective for the load transmission, between the intermediate member and first clutch member and between the intermediate member and second clutch member in the engagement position. The toothing width is thus defined by the distance B between two outer load toothing planes which are perpendicular to the axis of rotation and in which, in the engagement position, in each case a load toothing pairing is still just actively in engagement. Here, both load toothing planes can each be defined by the same load toothing pairing, or a first load toothing plane can be defined by a first load toothing pairing and a second load toothing plane can be defined by a second load toothing pairing.

Here, a load toothing pairing is the toothing pairing which is effective between the first clutch member and intermediate member and the toothing pairing which is effective between the second clutch member and intermediate member and via which, upon loading of the clutch against the overrunning direction (load rotation direction), with interposition of the intermediate member, torque is transmitted from the first clutch member to the second clutch member, or vice versa.

In an overrunning clutch designed in such a way, there can for example be provision that the intermediate member and further for example also the control mechanism is arranged at least partially, but completely, within the toothing width produced. The intermediate member and also the control mechanism are for example arranged, at least in the engagement position, completely within the toothing width.

The above-described arrangement of the control element allows a compact design which in addition, with corresponding configuration of the engagement ensuring the positive locking between the clutch members and the intermediate member, has a very high torque transmission potential.

The intermediate member can be of annular design and have an outer annular surface which is provided at least partially with an outer load toothing and have an inner annular surface which is provided at least partially with an inner load toothing, wherein the outer load toothing and the inner load toothing at least partially overlap as seen in the radial direction. In particular, the outer load toothing can overlap the inner load toothing at least partially, for example completely. The outer annular surface is for example provided over the full axial width of the intermediate member with a peripheral outer load toothing, whereas the inner annular surface is provided only in an axial subportion with a peripheral inner load toothing.

The load toothings provided on the intermediate member interact in a load-transmitting manner in the engagement position with load toothings, which correspond thereto, on the clutch members. What is meant by load toothing is the toothing which is provided on a clutch member or on the intermediate member and via which, if the intermediate member is situated in the engagement position, a load-transmitting positive locking is produced between the individual components. The formation of the intermediate member as intermediate ring having load toothings provided on the inner and outer annular surfaces radially on the inner side and radially on the outer side allows the desired high torque transmission potential of the overrunning clutch.

In order to allow the axial displacement, there can be provision that the intermediate member has a helical toothing on the radially inwardly pointing annular surface or on the radially outward pointing annular surface, wherein the helical toothing on the intermediate member is in engagement in a load-transmitting manner with a corresponding helical toothing on one of the clutch members upon rotational loading against the overrunning direction. The helical toothing exerts an axial force on the intermediate member by which the latter, depending on the loading direction, is forced from the engagement position into the overrunning position or from the overrunning position into the engagement position. The helical toothing thus has not only a load-transmitting function as load toothing but also a control function and thus simultaneously also forms a control toothing. When the overrunning clutch is rotationally loaded against the overrunning rotation direction and the intermediate member is situated in the engagement position, the intermediate member is for example in engagement in a load-transmitting manner, over the entire axial length of the helical toothing provided on the intermediate member, with the helical toothing provided on one of the clutch members. The helical toothing can extend over the entire axial length of the intermediate element or be provided only in certain portions in an axial subregion. There is for example provision that the load toothing provided on the outer annular surface of the intermediate member is formed by a helical toothing.

Depending on the structural configuration of the clutch, the intermediate member can be situated, both in the engagement position and in the overrunning position, completely on the inner side of the overlap with which the first clutch member overlaps the second clutch member with the formation of an axial overlapping region or annular space between the first and second clutch member in the engagement position. However, the intermediate member can also be situated completely in the overlapping region or the annular space only in the overrunning position or only in the engagement position, whereas, in the respective other position, as a result of the axial displacement causing the position change, it projects at least partially out of the space radially on the inner side of the overlap or the annular space, produced by the overlap, between the first and second clutch member.

In one embodiment, the control mechanism comprises a control element, for example in the form of a control pawl, which is freely pivotably mounted or freely pivotably supported on the intermediate member. By freely pivotable is meant a mounting or a support in which the control pawl is not preloaded by a positioning means such as a spring into a certain pivoting direction against control stops. The arrangement of the control pawl on the intermediate member additionally makes it possible for the first clutch member and the second clutch member to be configured in a structurally simpler manner, and the integration of the control pawl into the intermediate member contributes overall to the compactness of the overrunning clutch. The control element or the control pawl is moreover exclusively designed to initiate the axial displacement of the intermediate member. The control pawl also does not exert, or at least does not exert to a significant extent, a load-transmitting function in the engagement position in which the control pawl is for example held in a completely load-free manner.

By virtue of the fact that the at least one control pawl is arranged on the intermediate member, a particularly compact configuration of the overrunning clutch that can nevertheless be loaded with high torque can be realized. In particular, the control pawl can be mounted on the intermediate member so as to be pivotable in such a way that the control pawl is completely situated axially within the outer toothing planes defining the toothing width, for example both in the engagement position and in the overrunning position. However, embodiments are by all means also conceivable in which the control pawl is situated only partially within the planes defining the toothing width, in the overrunning position and/or in the engagement position.

The control mechanism is designed in such a way that it allows the axial displacement of the intermediate member from the overrunning position into the engagement position only in defined angle-of-rotation positions which ensure the transfer of the intermediate member into the engagement position. The control pawl forming part of the control mechanism is thus additionally a synchronization pawl by means of which the transfer of the intermediate member from the overrunning position into the engagement position can occur only when the orientations of the load toothings producing the positive locking between the intermediate member and clutch member in the engagement position are situated in an angle-of-rotation position with respect to one another that allows the transfer of the intermediate member from the overrunning position into the engagement position.

In order to actuate the control and synchronization pawl or the control element, the control mechanism can comprise a control part which, depending on the direction of rotation of a relative rotation between the clutch members, forces the control pawl from an open position into an engaged position or from an engaged position into an open position. The engaged position is the position in which the control pawl comes into contact with a control stop, as a result of which the intermediate member, while interacting with one of the clutch members, is forced into the engagement position. The open position is a position in which the control pawl is situated particularly when the clutch is loaded in the overrunning rotation direction.

It has proved to be advantageous if the control part interacts with a clutch member in such a way that, with the overrunning clutch loaded in the overrunning rotation direction, it forces the control element, e.g., a control pawl, continuously into the open position and can hold it there permanently. Such a configuration particularly has the advantage that a striking of the control pawl against a region of a clutch member that provides the control stops does not take place and the clutch therefore behaves in a low-noise manner even with loading in the overrunning direction.

In order to allow the sought low-noise behavior, there is provision that the control part is in frictional contact with a clutch member and, with a relative rotation of the clutch members with respect to one another, is positioned, under frictional force loading, directly or indirectly against the control pawl. This can be ensured by virtue of the fact that the control pawl engages in the control part and the control pawl thus interacts directly with the control part. However, a configuration is preferred in which a control arm interacting with the control pawl engages in the control part. Here, the control part interacts with the control pawl only indirectly in that the control part exerts an actuating force on the control arm which transmits said force to the control pawl as actuating torque by means of which the control pawl is forced from the engaged position into the open position or from the open position into the engaged position.

The control arm and the control pawl can be offset axially with respect to one another, with the result that the control part, control pawl, control arm and control stops can be arranged with an axial offset with respect to one another within the toothing width and interact with one another in a manner which is structurally simple to realize.

In an embodiment, the control part is designed as a single- or multipart friction ring which is in frictional contact with a clutch member. Such a friction ring interacts with the control pawl indirectly or directly in the above-described manner and can in particular form a projection or a plurality of projections with which the control element, that is to say in particular the control arm or the control pawl, comes into contact with exertion of an actuating force. The friction ring can here be in frictional contact with a radial friction surface (a radially outwardly or radially inwardly pointing friction surface) and/or within an annular groove with lateral surfaces by means of which the annular groove is axially delimited.

In order to receive the control pawl, control element receptacles, in particular control pawl receptacles, can be incorporated in the intermediate member in the form of radial pocket-like depressions or apertures. In order for the intermediate member also to be held in a sufficiently loadable manner in the region of such control element receptacles in spite of the material cutouts required therefor, there can be provision that the load toothing on the intermediate member on the radial inner side and/or the radial outer side is dispensed with in the region of these control element receptacles by formation of a toothing interruption, that is to say no tooth gaps of the load toothing are provided in the region of the control pawl receptacle. The load toothing, interacting with the latter on the intermediate member, on one of the clutch members is designed to correspond to the configuration of the load toothing configured on the intermediate ring. The intermediate member for example has arranged thereon a plurality of control element receptacles which can be uniformly distributed over the circumference of the intermediate member. A possible configuration is one in which two control element receptacles are designed to be diametrically opposite on the intermediate member, for example in each case in the region of a toothing interruption.

To initiate the change of the intermediate member from the overrunning position into the engagement position, there can be provision that the control pawl comes into contact, in an engaged position, with control stops provided on a clutch member. Particularly advantageous here is the configuration described at the outset in which the control stops is formed by parts of a load toothing provided on a clutch member.

In an embodiment, the overrunning clutch can also be designed as a blockable overrunning clutch in which a blocking member is provided which blocks the axial displacement of the intermediate member from the engagement position into the overrunning position when the blocking member is situated in a blocking position, and releases the axial displacement of the intermediate member from the engagement position into the overrunning position when the blocking member is situated in a release position.

A configuration and integration of a blocking member that can be realized in a structurally simple manner provides that the blocking member has a blocking toothing which corresponds to the helical toothing provided on one of the clutch members or has a blocking toothing which corresponds to the load toothing of a clutch member and which, with the blocking member situated in the release position, overlaps with the helical toothing or load toothing which is provided on the respective clutch member and to which the blocking toothing corresponds, with the result that, to assume the overrunning position, the intermediate member can move axially into the blocking member. By contrast, with the blocking member situated in the blocking position, the blocking toothing is rotated with respect to the helical toothing or load toothing, with the result that the intermediate member cannot leave the engagement position since it is forced against the blocking toothing and is thus blocked by the latter. The individual teeth of the blocking toothing here form individual blocking elements.

The blocking member is for example an externally toothed or internally toothed blocking ring which is rotated for the change between the blocking position and release position.

The blocking member can additionally be designed as an externally switchable blocking member which can be transferred by an external actuation from the blocking position into the release position and/or from the release position into the blocking position. One of the two positions of the blocking member or of the actuator which actuates the blocking member can be configured as a base position which the blocking member or the actuator automatically assumes when said blocking member is not force-loaded by the actuator (normally blocked or normally free). For automatic resetting into the base position, a restoring means, for instance a restoring spring, can provide a restoring force.

As an alternative to such a monostable configuration, there can also be chosen a bistable configuration in which the blocking member independently and permanently maintains the switching position (blocking position or release position) after it has been transferred into this position.

Various operating principles which are known in principle come into consideration for the actuation of the blocking member, such as for instance a hydraulic, pneumatic or electromagnetic actuation. Ramp or cam mechanisms can also be used.

However, the blocking member can also be designed as a self-switching blocking member in which at least one blocking element or a plurality of blocking elements are forced from a blocking position into a release position or from a release position into a blocking position by virtue of the fact that forces which occur within the clutch in an operating state-dependent manner and act on the blocking member or on the blocking member actuation are used as actuating forces for adjusting the blocking member and the blocking elements. Thus, for example, centrifugal forces can be used as actuating forces to force the blocking member, as a result of exceeding a certain limit rotational speed, from a blocking position into a release position or from a release position into a blocking position.

An application of an overrunning clutch according to the disclosure is represented by the use thereof in an axle drive unit for a drive train of a motor vehicle. Here, the overrunning clutch can be used to block a sun wheel, a planet set or an annulus and thus to realize a transmission stage. Such a use is considered in particular in an electromotive axle drive unit in which various transmission stages between an electromotive drive motor and the drive wheels of an axle and, where appropriate, recuperation operation and/or a reverse gear are realized via a 2-speed planetary gear mechanism which is in particular of multistage design. With respect to the at least also and, for example purely, electromotively operated axle drive unit having an overrunning clutch and to the use of the overrunning clutch in such an axle drive unit, reference is made to the international patent application PCT/EP2016/079169 in which the use of an overrunning clutch in an axle drive unit and the axle drive unit itself is described and the content of which, particularly insofar as it concerns the function and use of the overrunning clutch and the arrangement of an overrunning clutch on an axle drive unit, is hereby incorporated in this application.

BRIEF DESCRIPTION OF THE DRAWINGS

FIG. 3a shows the overrunning clutch according to the preceding figures in a sectional view in the engagement position also shown in FIG. 2, FIG. 3b shows the overrunning clutch according to the preceding figures in a sectional view with an intermediate member situated in the overrunning position and a blocking member situated in the release position, FIG. 4a shows the overrunning clutch according to the preceding figures in a plan view in the engagement position also shown in FIG. 2 and FIG. 3a, FIG. 4b shows the overrunning clutch according to the preceding figures in a plan view in the overrunning position also shown in FIG. 3b with omission of a front part of the intermediate member, FIG. 4c shows the overrunning clutch according to the preceding figures in a plan view in the engagement position also shown in FIG. 2 and FIG. 3a with omission of the blocking member and a front part of an inner clutch member, FIG. 5a shows the overrunning clutch according to one of the preceding figures in a perspective view in the engagement position also shown in FIG. 2 and FIG. 3a from behind with omission of the clutch housing, the blocking member and the intermediate member, FIG. 5b shows the overrunning clutch according to one of the preceding figures in a perspective view in the overrunning position also shown in FIG. 3b from behind with omission of the clutch housing, the blocking member and the intermediate member, FIG. 5c shows the overrunning clutch according to one of the preceding figures in a perspective view in an activation position.

DETAILED DESCRIPTION

Figure 1:
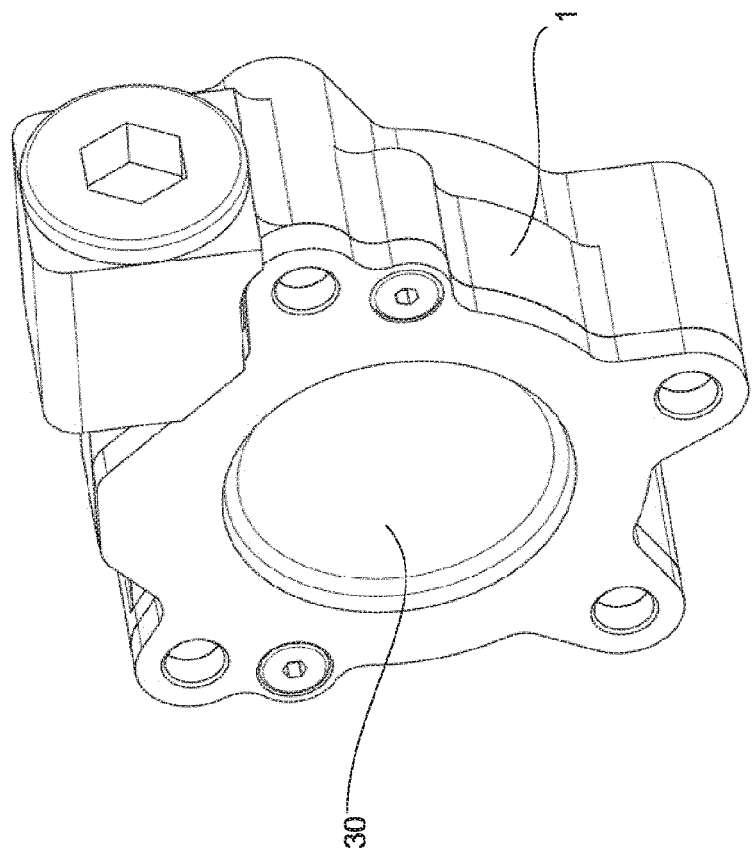
FIG. 1 shows a blockable overrunning clutch, which is used as a backstop, in an external view having a clutch housing function as a clutch member.

FIG. 1 shows in an external view a blockable overrunning clutch used for illustrative purposes. The overrunning clutch can, for example, be securely arranged on an axle drive unit of a motor vehicle via the housing and used as a backstop via which a sun wheel, a planet set or an annulus of a 2-speed planetary gear mechanism can be blocked in one direction of rotation and released in another direction of rotation. Here, the housing functions as a first clutch member 1 which, depending on whether the overrunning clutch is situated in an overrunning position in which it is released from a blocking member or in an engagement position, allows the rotation of a second clutch member in an overrunning direction or prevents it in the presence of a rotational loading (load rotation direction) opposite to the overrunning direction.

In the exemplary embodiment shown in the figures, the first clutch member 1 is an outer, stationary clutch member by means of which a back-rotation of a second clutch member 2 in a direction of rotation opposite to an overrunning direction can be prevented. However, in a different configuration of the overrunning clutch, while simultaneously maintaining the functions of the overrunning clutch which are described below, the first clutch member can also be a rotatably mounted clutch member and/or an inner clutch member. A use of a clutch designed according to the exemplary embodiments as an override clutch is thus also conceivable.

Figure 2:
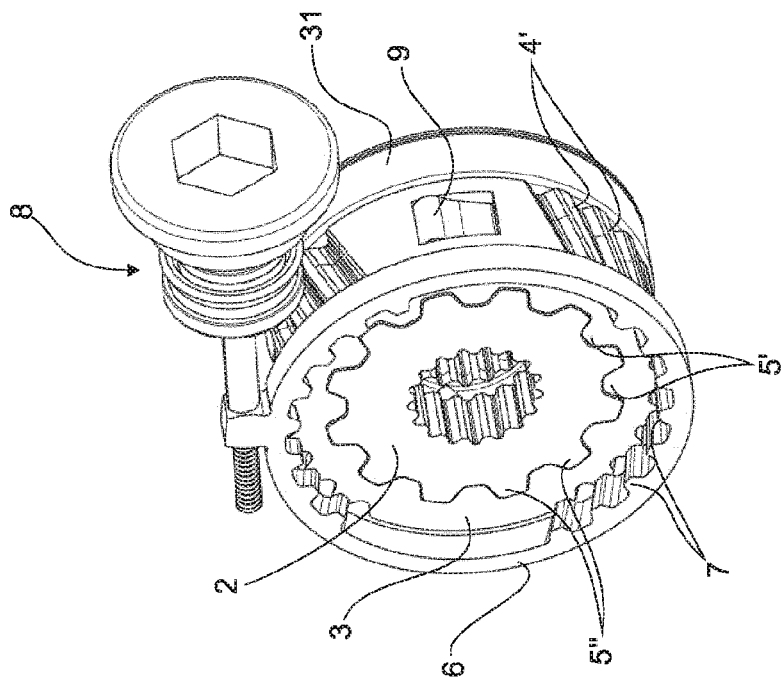
FIG. 2 shows the overrunning clutch according to the preceding figure with omission of the clutch housing with an intermediate member situated in the engagement position and a blocking member situated in the blocking position.

FIG. 2 provides a view of the interior of the overrunning clutch shown in FIG. 1 by graphic omission of the clutch housing and thus also with omission of the outer, first clutch member and by extensive graphic omission of a closure cover 30 which closes the clutch housing to the outside.

The position of the overrunning clutch that is illustrated in FIG. 2 is an engagement position. An axially displaceable intermediate member 3 is arranged between the outer, first clutch member 1 (corresponds to clutch housing in FIG. 1, omitted in FIG. 2) and an inner, second clutch member 2. The intermediate member 3 takes the form of an externally and internally toothed ring and is received in an annular space between the outer, first clutch member and the inner, second clutch member 2 that results by the first clutch member overlapping the second clutch member in the axial direction. In the exemplary embodiment shown in the figures, the first clutch member is the outer clutch member which axially overlaps the inner, second clutch member 2.

The intermediate member 3 has a helical toothing 4' as outer load toothing and an inner toothing 5' as inner-side load toothing. The outer-side helical toothing 4' is in engagement over the entire length of the outer helical toothing 4 with an inner helical toothing 4 which is provided on the inner side of the outer clutch member 1 and which is in particular also evident from FIG. 3b and FIG. 4c. In the exemplary embodiment illustrated by the figures, the outer helical toothing 4' extends over the entire axial width of the intermediate member 3. Other embodiments in which the helical toothing is shorter and extends only over one or more axial subportions of the intermediate member are also conceivable. In the engagement position shown in FIG. 2, FIGS. 3a and 4a, the inwardly directed toothing 5' is in engagement with an outer toothing 5" provided on the second clutch member 2. The inner toothing 5' on the intermediate member 3 or the outer toothing 5" on the inner, second clutch member 2 extend, as seen in the axial direction, only over a short axial subregion of the intermediate member 3 or of the inner clutch member 2 and also are in load-transmitting engagement with one another only in the engagement position.

The described toothing engagement pairings 4'4" and 5',5" form the load toothing pairings via which, with the overrunning clutch being used as intended, torque is transmitted, with interposition of the intermediate member, between the clutch members 1, 2. In the engagement position, these load toothing pairings are distributed axially over a toothing width B, which is visible from FIG. 3a. The toothing width B is defined by the axial distance between outer toothing planes perpendicular to the axis of rotation in which load toothing pairings effective on the inner side and/or outer side of the intermediate member are still just effective.

Since, in the exemplary embodiment shown in the figures, a load toothing 4' arranged on the intermediate member 3 and in engagement with the first clutch member 1 extends over the entire width of the intermediate member 3 and the load toothing 5' in engagement with the second clutch member 2 does not extend axially beyond the load toothing 4', the toothing width B simultaneously corresponds to the axial width of the intermediate member 3.

The intermediate member 3 is arranged so as to be axially displaceable between the inner clutch member 2 and the outer clutch member 1 and, under the action of the helical toothing pairing 4',4", can be displaced axially from the engagement position shown in FIG. 2 and FIG. 3a into the overrunning position shown in FIG. 3b. Whereas in FIG. 3a the intermediate member 3 and the inner clutch member 2 are in engagement via the toothing pairing 5',5" in an engagement position for load transmission and the intermediate member 3 is supported against the rolling bearing 31 by its axial outer surface pointing to the right, the intermediate member 3, in the position shown in FIG. 3b, is displaced to the left with disengagement from the inner clutch member 2.

For this purpose, a blocking ring 6 functioning as a blocking member has first of all been rotated relative to the first clutch member 1 from the blocking position shown in FIG. 2 and FIG. 3a, which is also illustrated in FIG. 4a, into the release position shown in FIG. 3b and FIG. 4b. In the blocking position shown in FIG. 2, FIG. 3a and FIG. 4a, a toothing on the blocking ring 6, as blocking toothing 7, which corresponds to the helical toothing 4" provided on the inner side of the outer clutch member 1, first of all still blocks an axial displacement of the intermediate member 3 to the left. Rotating the blocking ring 6 relative to the outer clutch member by means of a blocking member actuator 8 assigned to the blocking ring 6 causes the blocking ring to be rotated into the release position shown in FIG. 3b and FIG. 4b in which the blocking toothing 7 overlaps the helical toothing 4" provided on the inner side of the outer clutch member 1, with the result that the intermediate member 3 can move into the blocking toothing 7. The intermediate member 3 and inner clutch member 2 then come out of engagement, and the inner, first clutch member 2 can, by virtue of the decoupling from the intermediate member 3, rotate freely in the overrunning rotation direction F indicated in FIG. 4b.

The provision of a blocking member is not absolutely necessary for the function of the clutch as a mere overrunning clutch which allows free rotation in an overrunning direction and a load transmission with rotational loading opposite to the overrunning direction. However, the possibility is offered of blocking the clutch in the engagement position and thus, with the blocking member situated in the blocking position, of also allowing load transmission in the overrunning rotation direction in that the blocking member prevents the intermediate member from being able to assume the overrunning position.

It can be seen in FIGS. 2 to 5b that two control pawls 9, which form the control elements and also function as synchronization pawls, are arranged on the intermediate member 3 within the toothing width B and radially on the inner side of the overlap in which the outer, first clutch member 1 and the inner, second clutch member 2 engage over one another in an overlapping manner with the formation of an annular space. The control pawls 9 are arranged in two diametrically opposite pocket-like apertures in the intermediate member 3 (FIG. 2 and FIG. 4c) and are received in the intermediate member 3 in a freely pivotable manner and are supported radially on the outer side against the first clutch member 1 by their side facing away from the intermediate member. An additional bearing element interacting with the control pawls is not provided. Instead of the control elements being so freely received in the intermediate member and being supported on the adjacent clutch member, which ensures that the control elements can support a high load, it is also possible for the control pawls 9 to be pivotably mounted on bearing pins which are supported laterally of the control pawls on the intermediate member and engage in the control pawl.

The number of two control pawls shown in the figures and the diametrically opposite arrangement thereof, thus symmetrically loading the intermediate ring in an advantageous manner in the circumferential direction, has proved to be an advantageous configuration. However, a different number of control pawls can also be provided (one or more than two) and another arrangement can be selected.

It can be seen from FIG. 3a, FIG. 3b, FIG. 4c, FIG. 5a, FIG. 5b and FIG. 5c that the control pawls 9 are in engagement with a control member, which is designed as a friction ring 12, via a control arm 11 which is offset axially with respect to the control pawls 9. The friction ring 12 is in frictional contact with the inner clutch member 2 and with the inner ring of the bearing 31 but, during a relative rotation of inner clutch member 2 and intermediate ring 3, given that the control arm 11 positively interacts with the intermediate member 3 on the one hand and with the friction ring 12 on the other hand, prevented from corotating with the inner clutch member 2 and the inner ring of the bearing 30 that corotates therewith. Rather, the friction ring 12 is forced, by way of the projections which are formed thereon and which are formed by recesses 13 in the friction ring 12, against the control arms 11 which thereby experience an actuating force which acts in the circumferential direction of the friction ring 12 and by which, in turn, an actuating torque is exerted on the control pawls 9. Depending on the relative direction of rotation between the inner clutch member 2 and intermediate member 3, the control pawls 9 are thus either forced into an open position in which the free ends of the control pawls 9 are pivoted in the radial direction away from the first clutch member 2 and are situated outside the reach of the outer toothing 5 provided on the inner clutch member 2. Or the control pawls 9 are forced into an engaged position in which the free ends of the control pawls 9 are forced radially inward in the direction of the first clutch member 2 and thereby come into contact with the outer toothing 5. During a relative rotation of the inner clutch member 2 with respect to the intermediate ring 3 in the overrunning rotation direction F (FIG. 4b, FIG. 5b), the control pawls 9 are thus forced permanently outward out of engagement with the toothing 5" provided on the inner clutch member 2 into the open position. During a relative rotation of the inner clutch member 2 with respect to the intermediate ring 3 in the load rotation direction M (FIG. 4c and FIG. 5a) opposite to the overrunning rotation direction, the control pawls 9 are pivoted inwardly into the toothing 5 provided on the inner clutch member 2 and assume an engaged position.

The projections formed on the friction ring 12, which, in the exemplary embodiment shown, are formed by the edges of the recesses 13 that point in the circumferential direction, have an effective width which allows an axial displacement of the control pawls or control arms which bear against them and which move together with the intermediate member 3 in the axial direction.

The above-described interaction of the control pawls with a control member which actuates the control pawls in dependence on the relative direction of rotation between the intermediate member and a clutch member has the advantage, on the one hand, that the control pawls behave in a noise-free manner unlike control pawls positioned permanently against control stops via a spring element. In addition, the toothing used as load toothing on a clutch element is simultaneously also used as a control stop, which constitutes a considerable structural simplification since the control toothing, which is otherwise to be provided in addition to a load toothing and which forms control stops, are thereby unnecessary.

The operations during a change of the loading direction are described below.

If the overrunning clutch is situated in the engagement position shown in FIG. 3a and the inner clutch member 2 is force-loaded in the load rotation direction M, the torque is transmitted from the inner clutch member 2 to the intermediate ring. The latter is in engagement with the outer clutch member 1 via the helical toothing pairing 4',4" and is forced by the inclination of the helical toothing in FIG. 3a to the right against the inner ring of the bearing 31 and supported via the latter on the assembly to which the outer clutch member 1, which is formed by the clutch housing, is fixedly connected. In the loading direction M, the inner clutch member 2 is accordingly in a rotationally fixed, positive locking connection with the outer clutch member 1 via the intermediate member. By virtue of the configuration of the positive locking by means of highly loadable load toothings, the clutch has, in spite of its compactness, a very high torque transmission potential.

If there now occurs a change of the loading direction into the overrunning direction F depicted in FIG. 3b, the intermediate member 3, by virtue of the helical toothing pairing 4',4" now urged in the loading direction F, is first forced to the left. On account of the blocking ring 6, which is situated in the blocking position and whose blocking toothing 7 blocks the threads of the helical toothing 4', a movement of the intermediate member such that it comes out of engagement with the inner clutch member is excluded. The freewheeling is blocked in this manner and the clutch can function as a fixed clutch and also transmit torque in the overrunning direction F.

If, in a loading direction in the overrunning direction F, or before a change of the loading direction to the overrunning direction F, the blocking ring 6 is rotated via the locking member actuator 8 in order to bring the blocking toothing 7 into overlap with the inner-side helical toothing 4" and thus into the release position, the intermediate member 3 forced to the left by the helical toothing pairing 4',4" can move into the blocking ring 6 until the toothing pairing 5',5" between the intermediate member 3 and inner clutch member 2 comes out of engagement. The inner clutch member 2 can now freely rotate in the overrunning direction. The state shown in FIG. 3b is reached.

In this state, the inner clutch 2 also forces the friction ring 12 into the overrunning direction F under frictional force. However, by virtue of the control arm 11 dipping into the recess 13 provided on the friction ring 12, the friction ring 12 is prevented from corotating with the inner clutch member 2 and, via the driving projection which is formed by a control edge 10 of the recess 13 and which is in contact with the control arms 11, at the same time exerts an actuating force on the control arms 11 and thus a frictional force-initiated actuating torque on the control pawl 9 and forces the latter in this way continuously into the open position (FIG. 4b, FIG. 5b).

During a renewed change of the loading direction from the overrunning direction F into the opposite loading direction (load rotation direction M), the inner clutch member 2 first of all rotates by a small angular amount in the rotation direction M, with the result that a change of the active direction of the actuating force occurs between the friction ring 12 and control arm 11. The actuating force now exerted on the control arm 11 via a control edge 10 of the friction ring 12 at least briefly produces a frictional force-initiated actuating torque which acts on the control pawls 9 and as a result of which the free ends of the control pawls 9 pivot inward into an engaged position and come into contact with the outer load toothing 5" on the inner clutch member 2 (FIG. 4c, load toothing 5" outside the drawing plane, or FIG. 5c in which the intermediate ring is not yet situated in the engagement position). A torque emanating from the inner clutch member is now exerted via the control pawls 9 on the intermediate member 3, as a result of which the intermediate member 3, under the action of the helical toothing pairing 4',4", is forced again to the right into the engagement position until it has again assumed the engagement position which is shown in FIG. 3a and can be derived in FIG. 5a from the position of the control pawls and in which a torque to be transmitted are transmitted via the highly loadable toothing pairings 4',4" and 5',5". The control pawls 9 are virtually load-free in the engagement position.

In order to allow the movement into the engagement position, the geometric dimensions and the positioning of the control pawls 9 on the intermediate member are tailored to or synchronized with the toothing pairing 5', 5" in such a way that, when the control pawls 9 come into contact with the toothing 5" on the clutch member 2, the toothing 5' provided on the intermediate member can move laterally into the toothing 5" provided on the clutch member 2 (tooth in tooth gap). The control pawls 9 and the load toothing 5" thus also have a synchronizing function.

Figure 6B:
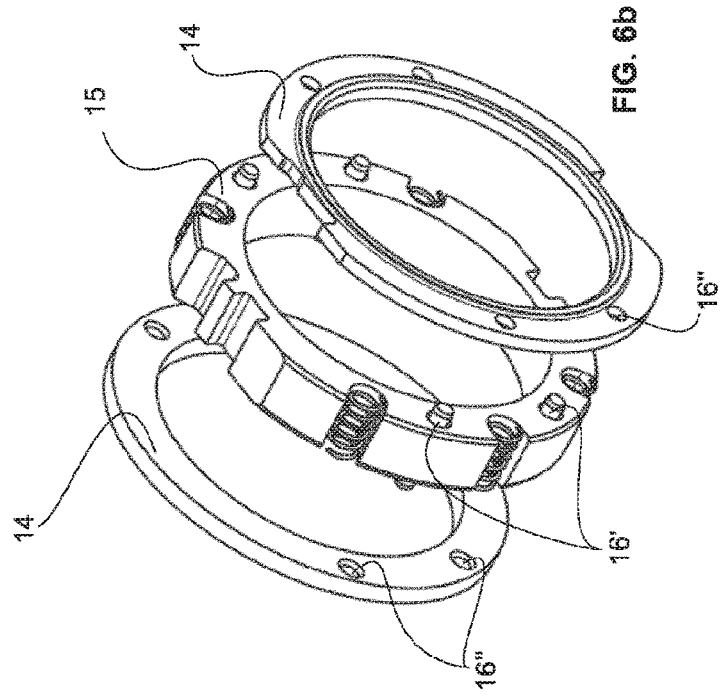
FIG. 6b shows the control part from FIG. 6a in an exploded illustration.
Figure 6A:
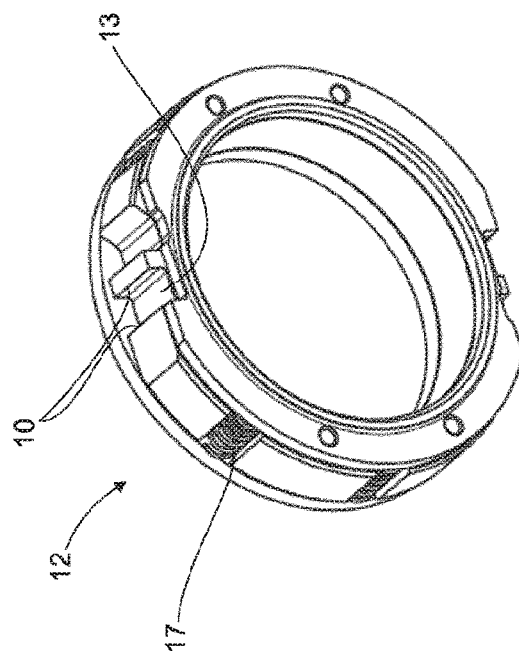
FIG. 6a shows a control part in the form of a friction ring that is used in the overrunning clutches according to one of the preceding figures.

For illustrative purposes, the control part designed as a friction ring 12 is shown in detail in FIG. 6a and FIG. 6b in a relaxed position.

The friction ring 12 has a number of recesses 13 which correspond to the number of control pawls or control arms and which are positioned corresponding to the positioning of the latter on the intermediate member and in which the control arms 11 interacting with the control pawls 9 can engage and which form control edges 10 which come into contact with the control arm 11 in order to be able to transmit the actuating forces exerted by the friction ring to the control arm 11. Of course, it is also possible for other types of projections or other means to be provided which allow the friction ring 12 to come into contact with the control arms 11 or directly with a control pawl 9.

The friction ring 12, which is of multipart design, is provided with friction members 14 which act in the axial direction, extend over at least a subportion of the circumference and are assigned to a carrier ring 15. Here, the friction members 14 and carrier ring 15 engage in one another via arresting means 16' and 16" which correspond to one another in such a way that the friction members are axially displaceable at least to a slight extent with respect to the carrier ring 15, but nevertheless are held in a rotationally secure manner with respect to the carrier ring 15. In the carrier ring 15 there are provided receptacles for preloading elements 17, for example in the form of the helical springs shown in the figures, via which the friction members 14 are urged away from the carrier ring 15 in the axial direction.

If, upon insertion into an annular gap delimited laterally by two boundary surfaces, the friction ring 12 is compressed in the axial direction, the preloading elements 17 exert an actuating force by means of which the friction members 14 are positioned by way of their lateral outer surfaces against the boundary surfaces laterally delimiting the annular gap.

Figure 7B:
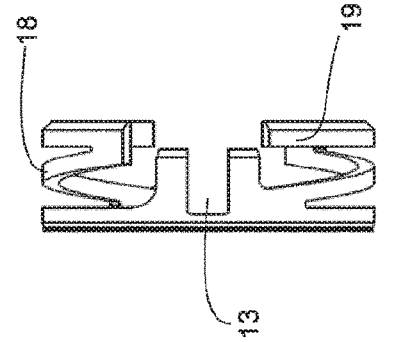
FIG. 7b shows the friction ring shown in FIG. 7a in a side view.
Figure 7A:
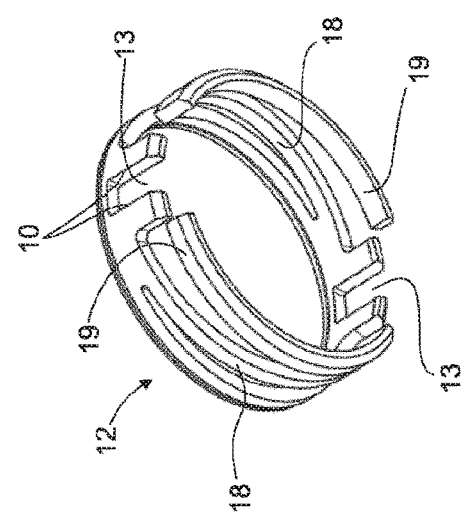
FIG. 7a shows an alternative embodiment of a control part designed as a friction ring in a perspective view.

An alternative embodiment of a friction ring 12 is shown in FIG. 7a and FIG. 7b. On the friction ring 12 there are provided bending webs 18 which act in the axial direction and which extend over at least a subportion of the circumference and which form the preloading elements and act as bending springs and exert an actuating force, which acts in the axial direction, on lateral arms 19 which extend in the circumferential direction over a subportion of the circumference of the friction ring. If, upon insertion into an annular gap delimited laterally by two boundary surfaces, the friction ring 12 is compressed in the axial direction, the bending webs as preloading elements exert a restoring force by means of which the friction ring 12 is positioned by way of its lateral outer surfaces formed by the lateral arms 19 against the boundary surfaces laterally delimiting the annular gap. This configuration also forms recesses 13 which form control edges 10.

In the case of the two above-described exemplary embodiments of a friction ring, it is ensured that the friction ring is received free of play in the annular gap. In addition, the frictional torque which the friction ring experiences when it is held in a stationary manner in the annular gap while the latter is rotating can be readily set via the configuration of preloading elements, that is to say, in the exemplary embodiments shown, via the springs or the bending webs and lateral arms. In the exemplary embodiments shown in the figures, the annular gap is formed between the inner ring of the bearing 31 and the lateral surfaces, facing the latter, of the load toothing 5" provided on the clutch member 2.

It should be pointed out that the arrangements or the assignments of the individual functional elements of the overrunning clutch, in particular the arrangement or assignment of the helical toothing, the control pawl, the control part, the control stops and the blocking member with its blocking elements on the first clutch member, the second clutch member or the intermediate ring, and the questions as to which of the two clutch members is arranged internally or externally with respect to the respective other clutch member in the overlapping region, whether the outer or inner clutch member is rotationally driven or merely exerts a supporting function, and which of the toothing types are provided radially on the outer side or radially on the inner side of the functional parts, are not mandatory for maintaining the basic function of the overrunning clutch described and for the structural configuration described as advantageous within the sense of the invention and do not necessarily have to be provided as shown in the figures. The subject matter of the invention is not departed from by changing the arrangement or assignment of the individual functional elements in relation to the embodiment shown in the figures.

It should additionally be pointed out that the overrunning clutch as shown in the figures can be designed as a backstop. However, the overrunning clutch can also be designed as an override clutch in which one clutch part rotationally drives the other of a load transmission direction and can override it in an overrunning direction.

LIST OF REFERENCE SIGNS

1 First clutch member
2 Second clutch member
3 Intermediate member
4' Outer helical toothing on the intermediate member
4" Inner helical toothing on the first clutch member
5' Inner toothing on the intermediate member
5" Outer toothing on the second clutch member
6 Blocking member (blocking ring)
7 Blocking toothing
8 Blocking member actuator
9 Control element (control and synchronization pawl)
10 Control edge
11 Control arm
12 Control part (friction ring)
13 Recesses in the friction ring
14 Friction members
15 Carrier ring
16', 16" Arresting means
17 Preloading elements
18 Bending web
19 Lateral arms
30 Outer closure cover
31 Rolling bearing

The invention claimed is:

1. An assembly comprising:
an overrunning clutch having a first clutch member, a second clutch member and an intermediate member which interacts with the first clutch member and second clutch member;
wherein the intermediate member, based on the direction of the rotational loading of the overrunning clutch, assumes an overrunning position or an engagement position;
wherein a change between the overrunning position and the engagement position occurs by an axial displacement of the intermediate member;
wherein at least one control mechanism is provided which initiates the axial displacement of the intermediate member from the overrunning position into the engagement position by a control element; and
wherein the first clutch member axially overlaps the second clutch member in the engagement position with formation of an effective toothing width, and the control element is arranged on the intermediate member at least partially within the effective toothing width;
wherein the effective toothing width is defined by an axial distance bridged overall by load toothing pairings between the intermediate member and the first clutch member and between the intermediate member and the second clutch member in the engagement position.

2. The assembly of claim 1, wherein the control element is arranged on the intermediate member and, in the overrunning position, comes into contact with a load toothing provided on the first clutch member or on the second clutch member in order to initiate the axial displacement of the intermediate member into the engagement position when the rotational loading changes from the overrunning rotation direction into the load rotation direction.

3. The assembly of claim 1, wherein a control part is arranged on the first clutch member or on the second clutch member, the control part interacting with the control element in order to initiate the axial displacement of the intermediate member arranged radially on the inner side of the overlap between the first clutch member and the second clutch member.

4. The assembly of claim 1, wherein the intermediate member is of annular design and has an outer annular surface provided at least partially with an outer load toothing and has an inner annular surface provided at least partially with an inner load toothing, wherein the outer load toothing at least partially axially overlaps the inner load toothing.

5. The assembly of claim 4, wherein the outer annular surface is provided over the full axial width with the outer load toothing, and the inner annular surface is provided with an inner load toothing only in a subportion of the inner annular surface.

6. The assembly of claim 1, wherein the intermediate member has a helical toothing on an inner annular surface or on an outer annular surface, wherein the helical toothing on the intermediate member is in engagement with a corresponding helical toothing on one of the clutch members.

7. The assembly of claim 1, wherein the control mechanism allows the axial displacement of the intermediate member from the overrunning position into the engagement position only in defined angle-of-rotation positions to transfer the intermediate member into the engagement position.

8. The assembly of claim 1, wherein the control mechanism includes a control part which, based on the direction of a relative rotation between the clutch members, forces the control element from an open position into an engaged position or from an engaged position into an open position, and wherein, when the overrunning clutch is loaded in an overrunning rotation direction, the control part continuously forces the control element into the open position.

9. The assembly of claim 8, wherein the control part is a friction ring in frictional contact with one of the clutch members and, during a relative rotation of the clutch members with respect to one another, is positioned under frictional force loading directly or indirectly against the control element.

10. The assembly of claim 9, wherein the control element or a control arm interacting with the control element engages the control part, the control arm and the control element being offset axially with respect to one another.

11. The assembly of claim 1, wherein one or more radial pocket-like depressions or apertures as control element receptacles are incorporated in the intermediate member for receiving the control element.

12. The assembly of claim 1, wherein the control element comes into contact, in an engaged position, with control stops provided on one of the clutch members, wherein the control stops are formed by a load toothing provided on the clutch member.

13. The assembly of claim 1, wherein a blocking member is provided which blocks the axial displacement of the intermediate member from the engagement position into the overrunning position when the blocking member is situated in a blocking position, and releases the axial displacement of the intermediate member from the engagement position into the overrunning position when it is situated in a release position.

14. The assembly of claim 13, wherein the blocking member has a blocking toothing which corresponds to a helical toothing of a clutch member or a blocking toothing which corresponds to load toothing of a clutch member and which, with the blocking member situated in the release position, overlaps with the helical toothing or the load toothing which is provided on the respective clutch member and which corresponds to the blocking toothing, wherein the intermediate member is movable axially into the blocking member to assume the overrunning position.

15. The assembly of claim 13, wherein the blocking member is an externally toothed or internally toothed blocking ring which is rotated for the change between the blocking position and release position.

16. The assembly of claim 13, wherein the blocking member is an externally switchable blocking member which is transferred by an external actuation from the blocking position into the release position or from the release position into the blocking position;
  wherein the blocking member has a monostable design and either the blocking position or the release position is a base position which the blocking member assumes when not force-loaded by the actuator.

17. The assembly of claim 13, wherein the blocking member is a self-switching blocking member and is forced from the blocking position into the release position or from the release position into the blocking position by forces occurring within the clutch in an operating state-dependent manner and acting on the blocking member or blocking elements are used as actuating forces for adjusting the blocking member.

18. The assembly of claim 1, wherein the overrunning clutch is part of an axle drive unit of a motor vehicle and the overrunning clutch is used to realize a transmission stage of a 2-speed planetary gear mechanism by blocking or releasing the rotation of at least one of: a sun wheel, a planet set, or an annulus.

19. The assembly of claim 18, wherein the overrunning clutch is blockable by a blocking member, the overrunning clutch is usable as a backstop, and the overrunning clutch is arranged to perform a reverse gear operation or a recuperation operation by the blocking member.

20. The assembly of claim 19, wherein the axle drive unit is electromotively driven and includes a 2-speed planetary gear mechanism via which a plurality of transmission stages are realized between an electromotive drive motor and drive wheels driven by the axle drive unit.

* * * * *